(12) United States Patent
Johnston et al.

(10) Patent No.: US 7,263,107 B1
(45) Date of Patent: Aug. 28, 2007

(54) DATA COMPRESSION OVER PACKET NETWORKS

(75) Inventors: Jim W. Johnston, Rancho Santa Marguarita, CA (US); Michael S. Beadle, Tustin, CA (US); Paul Wren, Valbonne (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 1199 days.

(21) Appl. No.: 10/004,655

(22) Filed: Dec. 4, 2001

Related U.S. Application Data

(63) Continuation-in-part of application No. 09/547,119, filed on Apr. 11, 2000, now Pat. No. 6,757,250.

(60) Provisional application No. 60/128,884, filed on Apr. 12, 1999, provisional application No. 60/130,416, filed on Apr. 21, 1999, provisional application No. 60/270,391, filed on Feb. 21, 2001.

(51) Int. Cl.
*H04J 3/22* (2006.01)

(52) U.S. Cl. ............... 370/467; 370/401; 375/222; 709/247

(58) Field of Classification Search ........... 370/401, 370/465, 466, 521, 477, 352–356, 400, 467, 370/493; 375/220–222; 709/246, 247
See application file for complete search history.

(56) References Cited

U.S. PATENT DOCUMENTS

| | | | |
|---|---|---|---|
| 5,483,530 A * | 1/1996 | Davis et al. ............... | 370/465 |
| 5,724,355 A * | 3/1998 | Bruno et al. ............... | 370/401 |
| 5,903,735 A * | 5/1999 | Kidder et al. ............... | 709/240 |
| 6,195,358 B1 * | 2/2001 | Bowater et al. ............ | 370/401 |
| 6,282,192 B1 * | 8/2001 | Murphy et al. ............. | 370/352 |
| 6,449,285 B1 * | 9/2002 | Mills .......................... | 370/466 |
| 6,463,135 B2 * | 10/2002 | Abrishami et al. .... | 379/100.01 |
| 6,788,651 B1 * | 9/2004 | Brent et al. ................. | 370/255 |
| 6,868,080 B1 * | 3/2005 | Umansky et al. ........... | 370/354 |
| 6,898,186 B2 * | 5/2005 | Doty et al. ................. | 370/244 |
| 2001/0005372 A1 * | 6/2001 | Cave et al. ................. | 370/401 |
| 2002/0001317 A1 * | 1/2002 | Herring ..................... | 370/493 |
| 2002/0009136 A1 * | 1/2002 | Heath ......................... | 375/240 |
| 2002/0085501 A1 * | 7/2002 | Guven et al. ............... | 370/252 |

FOREIGN PATENT DOCUMENTS

EP  1047231 A2 * 10/2000

* cited by examiner

*Primary Examiner*—John Pezzlo
(74) *Attorney, Agent, or Firm*—Farjami & Farjami LLP

(57) ABSTRACT

Methods and systems are provided for use in a MoIP system including a first modem, a second modem and a third modem. An exemplary communication method includes the steps of receiving a call from the first modem by the second modem over a telephone line, contacting the third modem by the second modem over a packet network, receiving information, from the third modem by the second modem, relating to one or more data compression protocols supported by the third modem, handshaking by the second modem with the first modem to establish a connection, and negotiating a first data compression protocol by the second modem with the first modem, wherein the first data compression protocol is according to the information relating to one of the one or more data compression protocols.

35 Claims, 6 Drawing Sheets

DATA COMPRESSION OVER PACKET NETWORKS

RELATED APPLICATIONS

The present application is a continuation-in-part of U.S. application Ser. No. 09/547,119, filed on Apr. 11, 2000, now U.S. Pat. No. 6,757,250 which claims priority of now abandoned U.S. Provisional Application No. 60/128,844, filed on Apr. 12, 1999, and now abandoned U.S. Provisional Application No. 60/130,416, filed on Apr. 21, 1999. The present application further claims the benefit of U.S. provisional application Ser. No. 60/270,391, filed Feb. 21, 2001, which is hereby fully incorporated by reference in the present application.

BACKGROUND OF THE INVENTION

1. Field of the Invention

The present invention relates generally to communications over packet networks. More particularly, the present invention relates to transferring compressed data over a packet network, such as the Internet, utilizing the Internet Protocol ("IP").

2. Related Art

In recent years, packet-based networks, such as the Internet, have begun to replace the traditional analog telephone networks for transportation of voice and data. For example, with the emergence of voice over IP ("VoIP"), telephone conversations may now be captured, packetized and transported over the Internet. In a conventional VoIP system, telephone conversations or analog voice may be transported over the local loop or the public switch telephone network ("PSTN") to the central office ("CO"). From the CO, the analog voice is transported to a gateway device at the edge of the packet-based network. The gateway device converts the analog voice or speech to packetized data using a codec (coder/decoder), according to one of various existing protocols, such as G.729, G.711, G.723.1, etc. Next, the packetized data is transmitted over the Internet using the Internet Protocol for reception by a remote gateway device and conversion back to analog voice.

Today, many have diverted their focus to using the existing packet-based network and gateway devices, which have been designed to support the transportation of analog voice or speech over IP, to further support modem communication over IP, or as it is referred to in the industry, Modem over Internet Protocol ("MoIP"). FIG. 1 illustrates a block diagram of a conventional communication model for MoIP based on a packet-based network, such as the Internet. As shown, communication model 100 includes first client communication device 110 in communication with first gateway communication device 120 over PSTN providing transmit and receive channels 112 and 114. Communication model 100 further includes second client communication device 150 in communication with second gateway communication device 140 over PSTN providing transmit and receive channels 144 and 142. Communication model 100 enables communications between first gateway communication device 120 and second gateway communication device 140 via a packet network 130 utilizing the Internet Protocol. The Internet Protocol implements the network layer (layer 3) of a network protocol, which contains a network address and is used to route a message to a different network or subnetwork. The Internet Protocol further accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. It is widely used for real-time voice and video transmissions where erroneous packets are not retransmitted.

For purposes of MoIP, communication devices 110, 120, 140 and 150 are capable of performing modem functions. The term modem stands for modulator-demodulator (i.e. digital-to-analog/analog-to-digital converter). Modem is a device that is capable of adapting a terminal or computer to an analog telephone line by converting digital pulses to audio frequencies and vice versa. Modems may support a variety of data modulation standards, such as ITU (International Telecommunications Union) standards: V.22bis, V.34, V.90 or V.92, etc. Communication devices 110, 120, 140 and 150 may also be cable or DSL modems, which are all digital and technically not modems, but referred to as modems in the industry. Typically, modems have built-in error correction, such as MNP2-4 or LAPM (or V.42) and data compression, such as MNP5, V.42bis or V.44. Modems are also capable of supporting various voice and facsimile standards.

Conventionally, the communication process for MoIP begins when first client modem (("M1") or first client communication device 110) calls first gateway modem (("G1") or first gateway communication device 120). As a result, G1 calls second gateway modem (("G2") or second gateway communication device 140), and G2 in turn calls second client modem (("M2") or second client communication device 150). In order to support VoIP in their default mode of operation, typically, G1 and G2 communicate in voice mode and are configured to use a compressed voice protocol, such as the ITU standard G.723.1. However, when M2 answers the incoming call from G2, M2 generates an answer tone, e.g. 2100 Hz, that causes G1 and G2 to switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the tones generated by M2 may propagate through G1 and G2 in a more intact manner in order to reach M1 at the other side.

One existing method provides for maintaining G1 and G2 in G.711 or modem pass through mode, such that M1 and M2 are able to handshake over packet network 130 and transfer data using G.711 packets using the Internet Protocol. However, such solution suffers from many problems, such as packet loss, jitter and delay, which cannot be tolerated by high-speed modems. To overcome such problems, modem connections are terminated locally such that M1 and G1 handshake and make a connection locally and, similarly, M2 and G2 handshake and make a connection locally.

As discussed above, today, most modems are capable of compressing/decompressing data to increase the effective data throughput. Conventional compression techniques used by modems include MNP5 (Microcom Networking Protocol 5) and ITU standards V.42bis or V.44. After M1 and G1 modems establish a connection, M1 compresses, packetizes and transmits data to G1 on line 112 and G1 receives, depacketizes and decompresses the data prior to packetizing the data for transmission over packet network 130. Similarly, after M2 and G2 modems establish a connection, M2 compresses, packetizes and transmits data to G2 on line 144 and G1 receives, depacketizes and decompresses the data prior to packetizing the data for transmission over packet network 130. As a result, uncompressed data will be transported over packet network 130. However, it is, of course, highly desirable to transport compressed data over packet network 130 to increase the effective data rate and, to this end, various proposals have been set forward.

For example, one proposal recommends re-compression of the data by a gateway modem, e.g. G1, prior to transmission of the data over packet network 130 and, naturally, decompression of such data received by G2 over packet network 130. However, this proposal places an undesirable processing burden on gateway modems G1 and G2, since each gateway modem must (1) decompress data received from its local client modem, (2) re-compress such data prior to transmission over the IP, (3) decompress data received from the other gateway modem, and (4) re-compress such data prior to transmission to is local client modem. Further, each gateway modem must provide additional memory to accommodate the additional compression and decompression tasks.

As a further example, another proposal recommends a synchronization of the two locally terminated connections, i.e. M1/G1 connection and M2/G2 connection, such that the two connection occur simultaneously, so M1 and M2 may negotiate error correction and compression end-to end. Thus, G1 and G2 would not have to perform modem error correction and compression tasks. However, this recommendation also suffers from many problems. For example, due to various handshaking delays and many different data modulations and speeds that are supported by modems, it is extremely difficult to synchronize the two locally terminated connections, such that the two connections can occur simultaneously. As a result, on many occasions, M1 and M2 would fail to establish an error correction/compression link due the connections not being properly synchronized.

Accordingly, there is an intense need in the art for MoIP systems and methods of transporting compressed data over packet networks, which are practical to implement, cost-effective and can reduce undue burden on gateway modems in terms of processing power and memory.

SUMMARY OF THE INVENTION

In accordance with the purpose of the present invention as broadly described herein, there is provided MoIP systems and methods for transporting compressed data over a packet network, such as the Internet, utilizing the Internet Protocol. According to one aspect of the present invention communication methods and systems are provided for use in a MoIP system including a first modem, a second modem and a third modem. An exemplary communication method includes the steps of receiving a call from the first modem by the second modem over a telephone line, contacting the third modem by the second modem over a packet network, receiving information, from the third modem by the second modem, relating to one or more data compression protocols supported by the third modem, handshaking by the second modem with the first modem to establish a connection, and negotiating a first data compression protocol by the second modem with the first modem, wherein the first data compression protocol is according to the information relating to one of the one or more data compression protocols.

In a further aspect of the present invention, the method further includes the steps of receiving a first compressed data from the first modem by the second modem, wherein the first compressed data is compressed according to the first data compression protocol, transmitting the first compressed data to the third modem by the second modem, receiving a second compressed data from the third modem by the second modem, wherein the second compressed data is compressed according to a second data compression protocol, decompressing the second compressed data, by the second modem, according to the second data compression protocol to generate a second decompressed data, compressing the second decompressed data to generate a third compressed data, wherein the third compressed data is compressed by the second modem according to the first protocol, and transmitting the third compressed data to the first modem by the second modem.

In yet another aspect, information relating to the one or more data compression protocols includes information relating to at least one parameter of at least one of the one or more data compression protocols. For example, in one aspect, the at least one parameter is a dictionary size.

In one aspect, the communication method also includes the steps of determining that the first data compression protocol, including its parameters, is the same as a second data compression protocol, including its parameters, negotiated between the third modem and a fourth modem, receiving a first compressed data from the third modem by the second modem, wherein the first compressed data is compressed according to the first data compression protocol, and transmitting the first compressed data to the first modem by the second modem.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a modem over IP network, it should be noted that the present invention may be implemented in other communication networks and is not limited to modem over IP. Indeed, for the sake of brevity, conventional data transmission, compression/decompression, error-correction, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
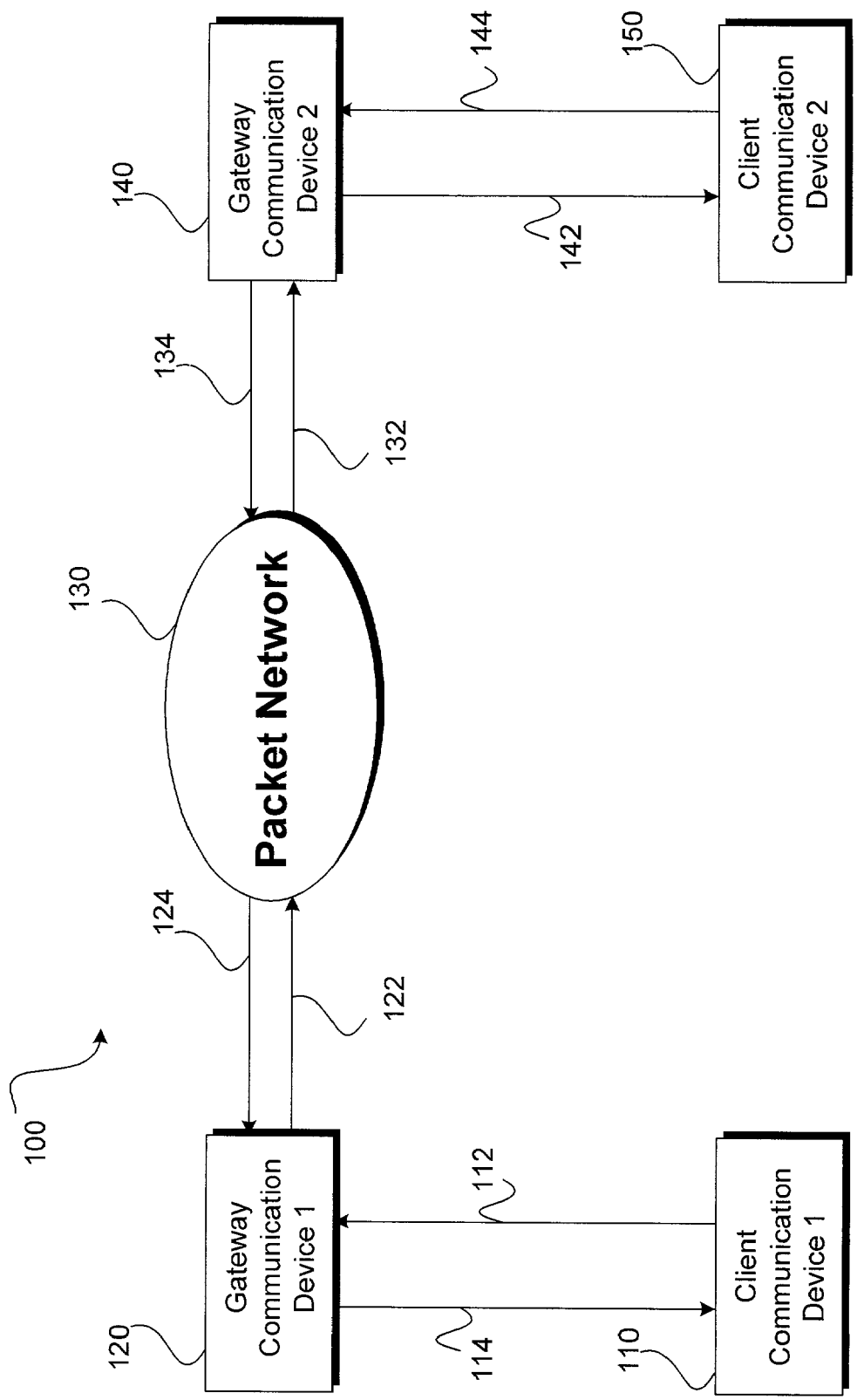
FIG. 1 illustrates a block diagram of a prior art communication model based on a packet network, such as the Internet, utilizing the Internet Protocol.
Figure 2:
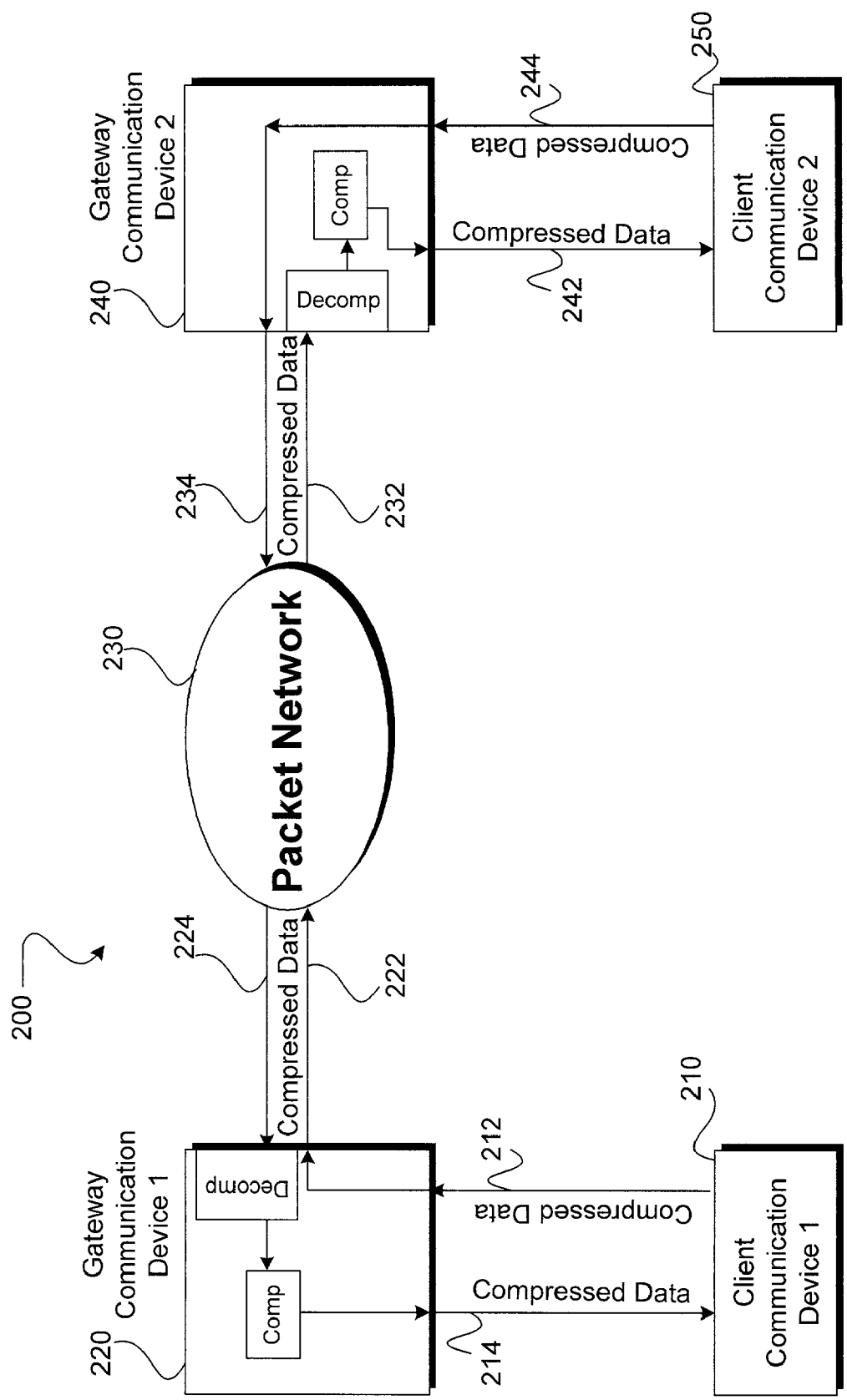
FIG. 2 illustrates a block diagram of a communication system, according to one embodiment of the present invention, based on a packet network, such as the Internet, utilizing the Internet Protocol.
Figure 3:
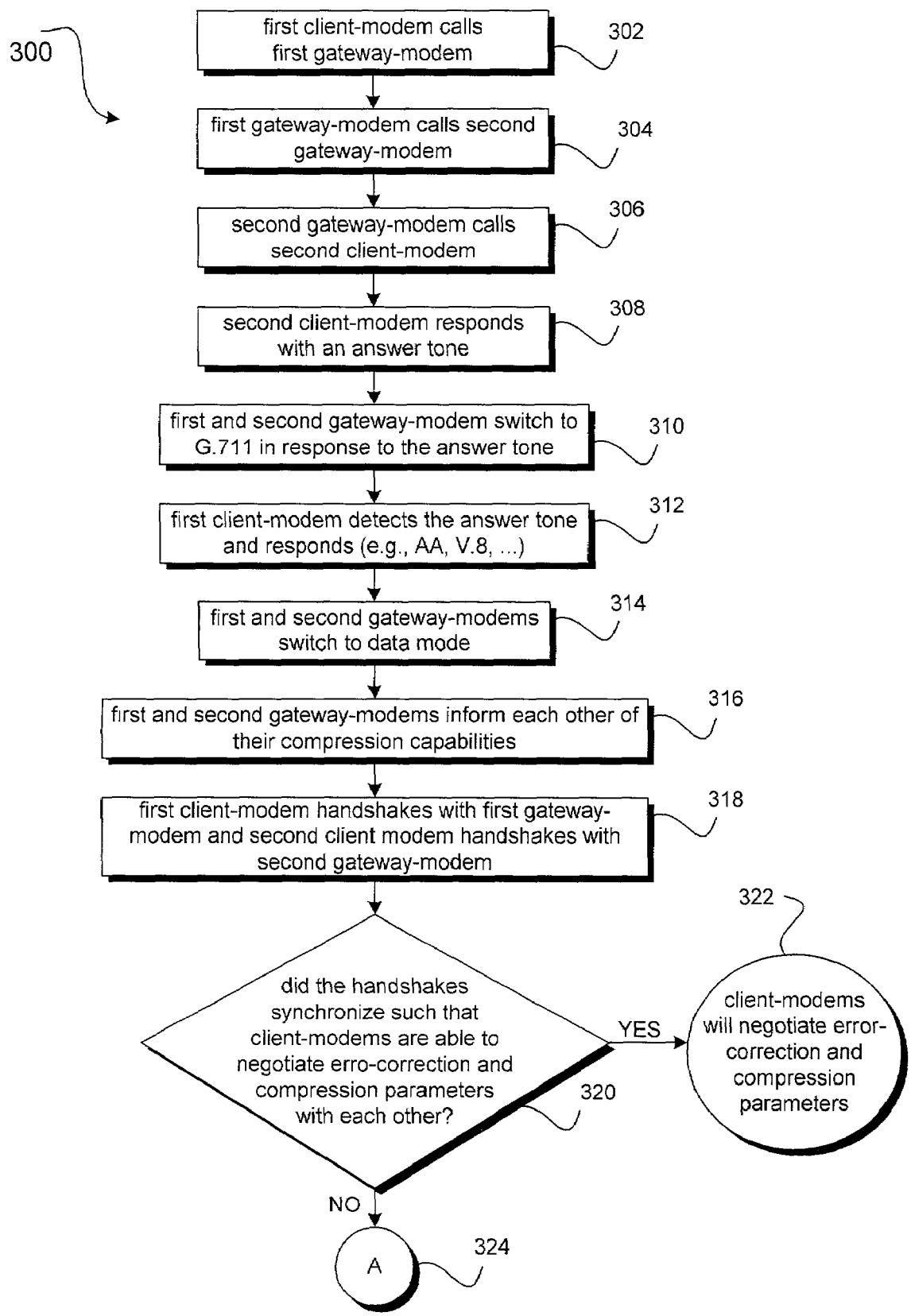
FIG. 3 illustrates an exemplary flow diagram of a communication method of the present invention utilizing the communication system of FIG. 2.
Figure 3:
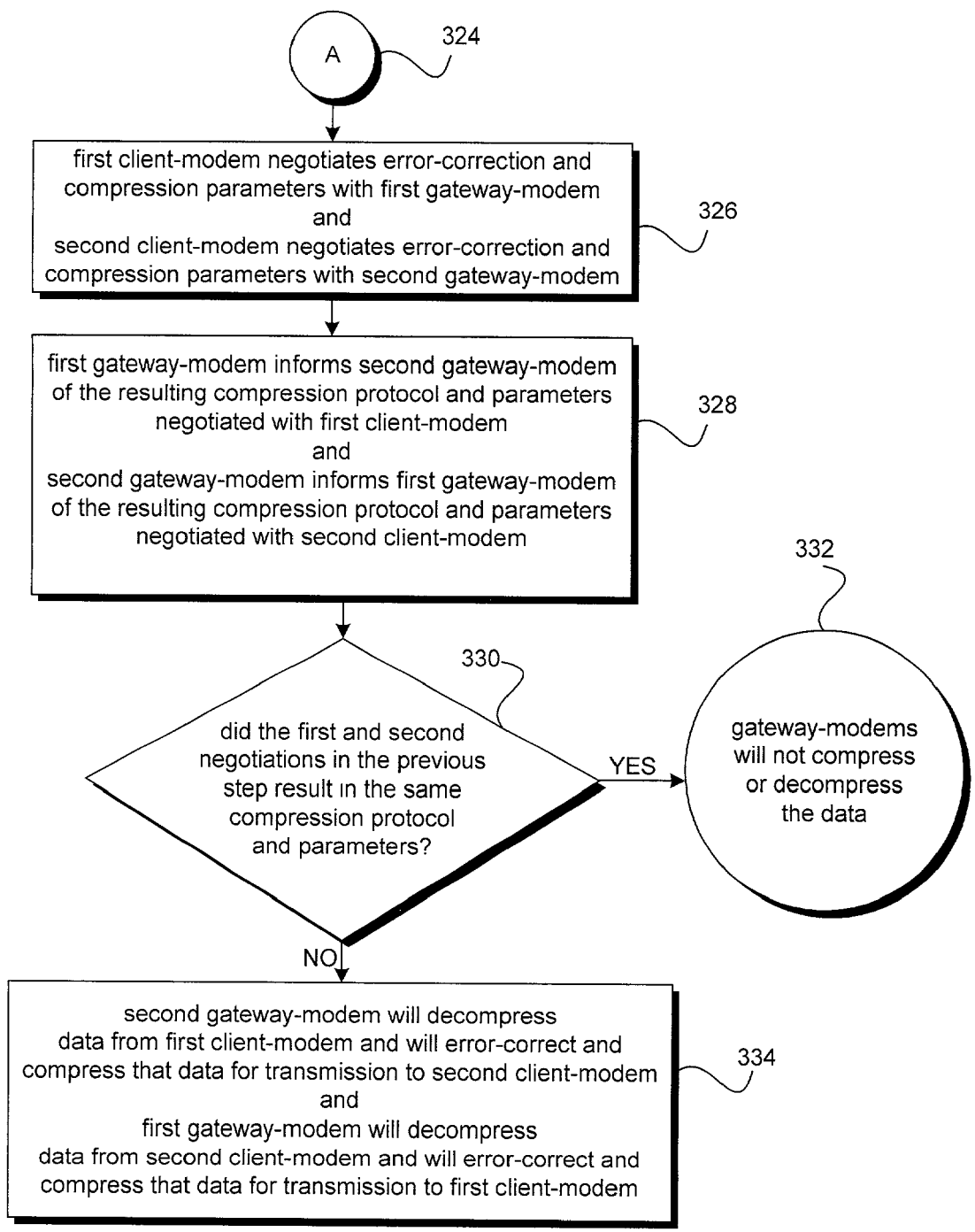

FIG. 2 illustrates a block diagram of an exemplary communication system of the present invention based on a packet network environment utilizing the Internet Protocol, and FIG. 3 illustrates a flow diagram of a communication method 300 of the present invention utilizing the communication system of FIG. 2. As shown, communication method 300 begins at step 302, when first client communication device or first client modem 210 calls first gateway communication device or first gateway modem 220 over a communication line, such as a telephone line. In response, in step 304, first gateway modem 220 calls or contacts second gateway communication device or second gateway modem 240 over packet network 230. As a result, in step 306, second gateway modem 240 calls second client communication device or second client modem over a communication line, such as a telephone line.

Typically, as their default mode of operation, first and second gateway modems 220 and 240 communicate in voice mode and use a compressed voice protocol, such as a speech protocol based on the ITU standard G.723.1. However, when second client modem 250 answers the incoming call from second gateway modem 240, second client modem 250 generates an answer tone, e.g. 2100 Hz, that causes first and second gateway modems 220 and 240 to switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the answer tone generated by second client modem 250 may propagate through second gateway modem 240 and first gateway modem 220 in a more intact manner in order to reach first client modem 210.

In step 312, upon detection of the answer tone by first client modem 210, first client modem 210 responds based on its current setting or mode of operation. For example, if first client modem 210 is a V.90 modem and the answer tone indicates that second client modem 250 supports a V.90 data modulation protocol, first client modem 210 may respond by transmitting a V.8 signal. In another mode, first client modem 210 may respond by transmitting an AA signal. All such signals are described in various ITU standards and are known to those of ordinary skill in the art. Now, in step 314, first and second gateway modems 220 and 240 detect the modem signals transmitted by first client modem 210 and, at this point, first and second gateway modems 220 and 240 switch to data mode to accommodate a modem connection. It should be noted that first and second gateway modems 220 and 240 may use a variety methods to switch from voice mode to data mode; for example, first gateway modem 220 may look for and detect a specific modem signal from first client modem 210 and upon detection of such signal inform second gateway modem 240, so both first and second gateway modems 220 and 240 may timely switch to data mode.

Preferably, in step 316, at any time prior to the start of modem handshakes between first client modem 210 and first gateway modem 220, on one hand, and between second client modem 250 and second gateway modem 240, on the other hand, first gateway modem 220 and second gateway modem 240 inform each other of their own data compression capabilities, such as compression protocols including parameters for each protocol. For example, first gateway modem 220 and second gateway modem 240 may exchange data packets, over packet network 230, which data packets include parameters indicating support for MNP5, V.42bis and/or V.44 data compression. In addition, the parameters may include data compression dictionary size, string length, etc. and other capabilities of the compression techniques supported by each first and second gateway modems 220 and 240. The parameters may also include any and all compression parameters that can be negotiated between the modems, including those negotiable parameters set forth in relevant specifications for V.42bis, MNP5 or V.44 protocols, which are hereby incorporated by reference.

Next, in step 318, first client modem 210 and second client modem 250 start handshaking with first gateway modem 220 and second gateway modem 240, respectively. The two handshakes may use different data modulation protocols. For example, first client modem 210 and first gateway modem 220 may handshake using V.34 data modulation protocol and second client modem 250 and second gateway modem 240 may handshake using V.90 or V.92 data modulation protocol. Depending on various factors, such as modem capabilities, settings or line conditions, first client modem 210 and first gateway modem 220 may connect at a different speed than or the same speed as second client modem 250 and second gateway modem 240. Regardless, however, if it is decided in step 320 that the two connections were established at substantially the same time, communication method 300 moves to state 322 where first client modem 210 and second client modem 250 may negotiate an error-correction protocol and data compression protocol between themselves, such that first and second gateway modems 220 and 240 have no need to be aware of or involved in such negotiated protocols between first and second client modems 210 and 250. As a result, compressed data may be passed over packet network 230 between first and second client modems 210 and 250, without first and second gateway modems 220 and 240 decompressing or re-compressing such data. Accordingly, first and second client modems 210 and 250 will perform end-to-end error-correction and data compression/decompression.

However, if, in step 320, it is decided that the two connections did not get established at substantially the same time, communication method 300 moves to step 324 and from there to step 326. It should be noted that in some embodiments, steps 320-324 may be by-passed and communication method 300 may move directly from step 318 to step 326, and the test in step 320 may not be performed.

Turning to step 326, first client modem 210 negotiates an error-correction protocol and a data compression protocol with first gateway modem 220 and second client modem 250 negotiates an error-correction protocol and a data compression protocol with second gateway modem 240. It should be noted that in some embodiments, first client modem 210 and first gateway modem 220 (or second client modem 250 and second gateway modem 240) may only negotiate a compression protocol and not an error correction protocol As described above, since first and second gateway modems 220 and 240 are aware of each other's data compression capabilities as a result of their parameter exchanges in step 16, each of first and second gateway modems 220 and 240 will negotiate such data compression protocol and parameters, with its respective client modem, which are also supported by the other gateway modem. For example, in step 316, second gateway modem 240 may inform first gateway modem 220 that second gateway modem 240 can support V.42bis and MNP5 compression protocols, and first gateway modem 220 may inform second gateway modem 240 that first gateway modem 220 can support V.42bis, MNP5 and V.44 compression protocols. As a result, in step 326, first gateway modem 220 will inform first client modem 210 that first gateway modem 220 can only support V.42bis and MNP5 (but not V.44 knowing that second gateway modem 240 is not able to support such compression protocol). Accordingly, first and second gateway modems negotiate a data compression protocol with their respective client modems, such that both gateway modems are capable of supporting. It should be noted that each gateway modem further negotiates only those parameters of a given compression protocol that can be supported by the other gateway modem. For example, if first gateway modem 220 is able to support a maximum 1K dictionary size for V.42bis, second gateway modem 240 would not negotiate a dictionary size greater than 1K with second client modem 250.

Continuing with communication method 300, in step 328, each gateway modem informs the other of the resulting error-correction protocol, compression protocol and parameters that each negotiated with its respective client modem. For example, first gateway modem 220 may inform second gateway modem 240 that first gateway modem 220 and first client modem 210 negotiated MNP5 data compression and transmit the specific data compression parameters to second gateway modem 240 over packet network 230. On the other hand, second gateway modem 240 may inform first gateway modem 220 that second gateway modem 240 and second client modem 250 negotiated V.42bis data compression and transmit the specific data compression parameters, such as dictionary size and string length, etc. to first gateway modem 220 over packet network 230.

In step 330, first and second gateway modems 220 and 240 determine whether they both negotiated the same data compression protocol, including compression parameters, with their respective client modems. For example, first and second gateway modems 220 and 240 may determine that they both negotiated V.44 data compression protocol with the same dictionary size, string length, etc. with their respective client modems. In that event, communication method 300 moves to state 332, wherein first and second gateway modems 220 and 240 do not decompress or compress data from their respective client modems and allow the two client modems perform the compression and decompression tasks. As a result, compressed data is passed over the IP network.

However, if, in step 330, first and second gateway modems 220 and 240 determine that they have not negotiated the same data compression protocol, or even if the same protocol has been negotiated, but the parameters, such as V.44 dictionary size, string length and so forth are different, then communication method 300 moves to step 334. It should be noted that in some embodiments, steps 330 and 332 may be by-passed and communication method 300 may move directly from step 328 to step 334, and the test in step 330 may not be performed.

In step 334, first gateway modem 220 is configured such that the data from first client modem 210 is error-corrected (if an error correction protocol was negotiated) but not decompressed, and the compressed data is passed to second gateway modem 240 via packet network 230. With reference to FIG. 2, compressed data is transmitted by first client modem 210 on line 212 to first gateway modem 220, where the compressed data passes through packet network 230 on lines 222 and 232 to second gateway modem 240 without first gateway modem 220 performing decompression and re-compression. As further shown in FIG. 2, second gateway modem 240, which has configured its receiver to be compatible with first client modem 210 compression protocol, receives the compressed data on line 232 and decompresses the compressed data to generate decompressed data. Further, second gateway modem 240 then subjects the decompressed data to error-correction (if negotiated) and data compression negotiated between second gateway modem 240 and second client modem 250. Next, second gateway modem 240 transmits the compressed data to second client modem 250 on line 242, and second client modem 250 performs error-correction (if negotiated) and data decompression on the data.

Further, in step 334, second gateway modem 240 is configured such that the data from second client modem 250 is error-corrected (if an error correction protocol was negotiated) but not decompressed, and the compressed data is passed to first gateway modem 220 via packet network 230. Referring to FIG. 2, compressed data is transmitted by second client modem 250 on line 244 to second gateway modem 240, where the compressed data passes through packet network 230 on lines 234 and 224 to first gateway modem 220 without second gateway modem 240 performing decompression and re-compression. As further shown in FIG. 2, first gateway modem 220, which has configured its receiver to be compatible with second client modem 250 compression protocol, receives the compressed data on line 224 and decompresses the compressed data to generate decompressed data. Further, first gateway modem 220 then subjects the decompressed data to error-correction (if negotiated) and data compression negotiated between first gateway modem 220 and first client modem 210. Next, first gateway modem 220 transmits the compressed data to first client modem 210 on line 214, and first client modem 210 performs error-correction (if negotiated) and data decompression on the data.

Figure 4:
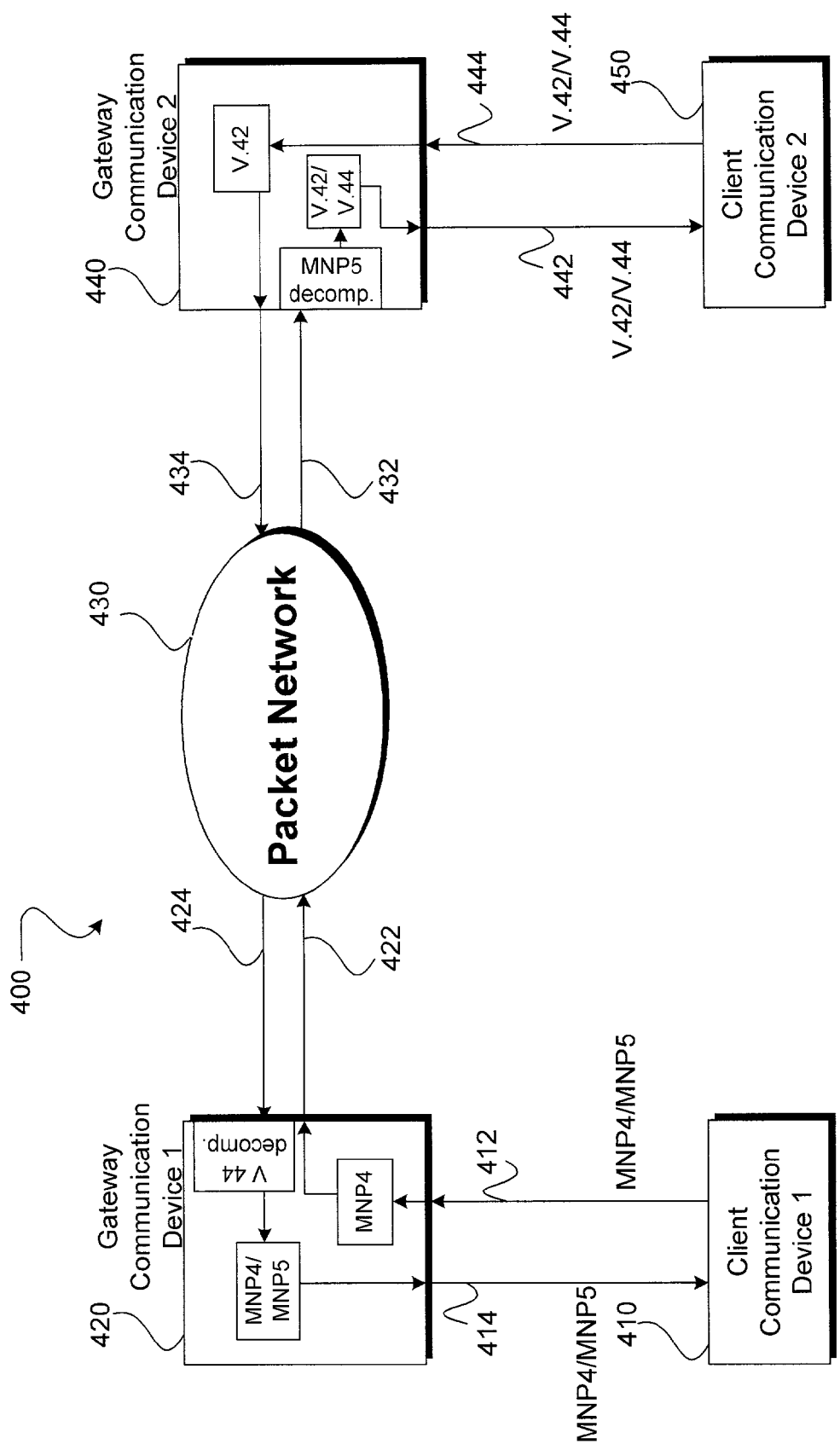
FIG. 4 illustrates a block diagram of a communication system, according to one embodiment of the present invention, based on a packet network, such as the Internet, utilizing the Internet Protocol.

FIG. 4 illustrates a block diagram of a communication system, according to one embodiment of the present invention, based on a packet network, such as the Internet, utilizing the Internet Protocol. FIG. 4 shows an exemplary embodiment, wherein first client modem 410 can support MNP5 and V.42bis data compression protocols; first gateway modem 420 can support MNP5, V.42bis and V.44 data compression protocols; second gateway modem 440 can support MNP5 and V.44 data compression protocols; and second client modem 450 can support MNP5, V.42bis and V.44 data compression protocols.

As described in conjunction with communication method 300 in FIG. 3, since at step 316 each of first and second gateway modems 420 and 440 informs the other of its data compression capabilities, in step 318, first gateway modem 420 and first client modem 410 will negotiate MNP5 data compression, because V.42bis is not supported by second gateway modem 440, even though first client modem 410 and first gateway modem 420 are both capable of negotiating V.42bis. In other words, MNP5 data compression protocol is the common denominator of data compression protocols that are supported by first client modem 410, first gateway modem 220 and second gateway modem 440.

Further, in step 318, second gateway modem 440 and second client modem 450 will negotiate either MNP5 or V.44 data compression protocol, since MNP5 and V.44 data compression protocols are the common denominator of data compression protocols that are supported by first gateway modem 220, second gateway modem 440 and second client modem 450. As a further example, assuming second gateway modem 440 and second client modem 450 proceed to negotiate based on V.44 data compression protocol, if first gateway modem 420 and second gateway modem 440 could not, for example, support the same V.44 data compression dictionary size, string length, etc. (as determined based on the information exchange of step 316), second gateway modem 440 would negotiate such V.44 data compression parameters with second client modem 450 that could also be supported by first gateway modem 420.

Now, according to step 328 of communication method 300, first and second gateway modems 420 and 440 inform one another of the data compression protocols that each negotiated with its respective client modem 410 or 450, respectively, and the negotiated parameters, such as dictionary size, etc. Based upon such information, first gateway modem 420 configures its data receiver in communication with line 424 to be compatible with second client modem 450 data compression protocol, i.e. V.44, including the parameters. In addition, first gateway modem 420 configures its data transmitter in communication with first client modem receive line 414 to be compatible with first client modem 410 error-correction and data compression protocols, i.e. MNP4/MNP5, including the parameters. Similarly, second gateway modem 440 configures its data receiver in communication with line 432 to be compatible with first client modem 410 data compression protocol, i.e. MNP5, including the parameters. In addition, second gateway modem 440 configures its data transmitter in communication with second client modem receive line 442 to be compatible with second client modem 450 error-correction and data compression protocols, i.e. V.42/V.44, including the parameters.

As further shown, first gateway modem 420 does not perform data decompression, but only error-correction, on the data received from first client modem 410 on receive line 412. Such data is passed along over packet network 430 on lines 422 and 432 to second gateway modem 440, where second gateway modem 440 performs data decompression according to the MNP5 protocol. Next, second gateway modem 440 applies V.42 error-correction and V.44 data compression, and transmits the data to second client modem 450 for V.42 error-correction and V.44 data decompression. Similarly, second gateway modem 440 does not perform data decompression, but only error-correction, on the data received from second client modem 450 on receive line 444. Such data is passed along over packet network 430 on lines 434 and 424 to first gateway modem 420, where first gateway modem 420 performs data decompression according to the V.44 protocol. Next, first gateway modem 420 applies MNP4 error-correction and MNP5 data compression, and transmits the data to first client modem 410 for MNP4 error-correction and MNP5 data decompression.

It should be noted that in some embodiments, for example, a gateway modem (such as first gateway modem 420) may only support the decompression portion of a data compression protocol, such as MNP5 and yet inform second gateway modem 440 that first gateway modem 420 is capable of supporting MNP5, knowing that first client modem 410 and not first gateway modem 420 will be performing the compression portion. Also, for example, a gateway modem (such as second gateway modem 440) may only support a compression portion of a data compression protocol, such as V.44 and yet inform second client modem 450 that second gateway modem 440 is capable of supporting V.44, knowing that first gateway modem 420 and not second gateway modem 440 will be performing the decompression portion. Accordingly, gateway modem implementation may save additional memory space by not implementing or using both compression and decompression portions of a data compression protocol.

Figure 5:
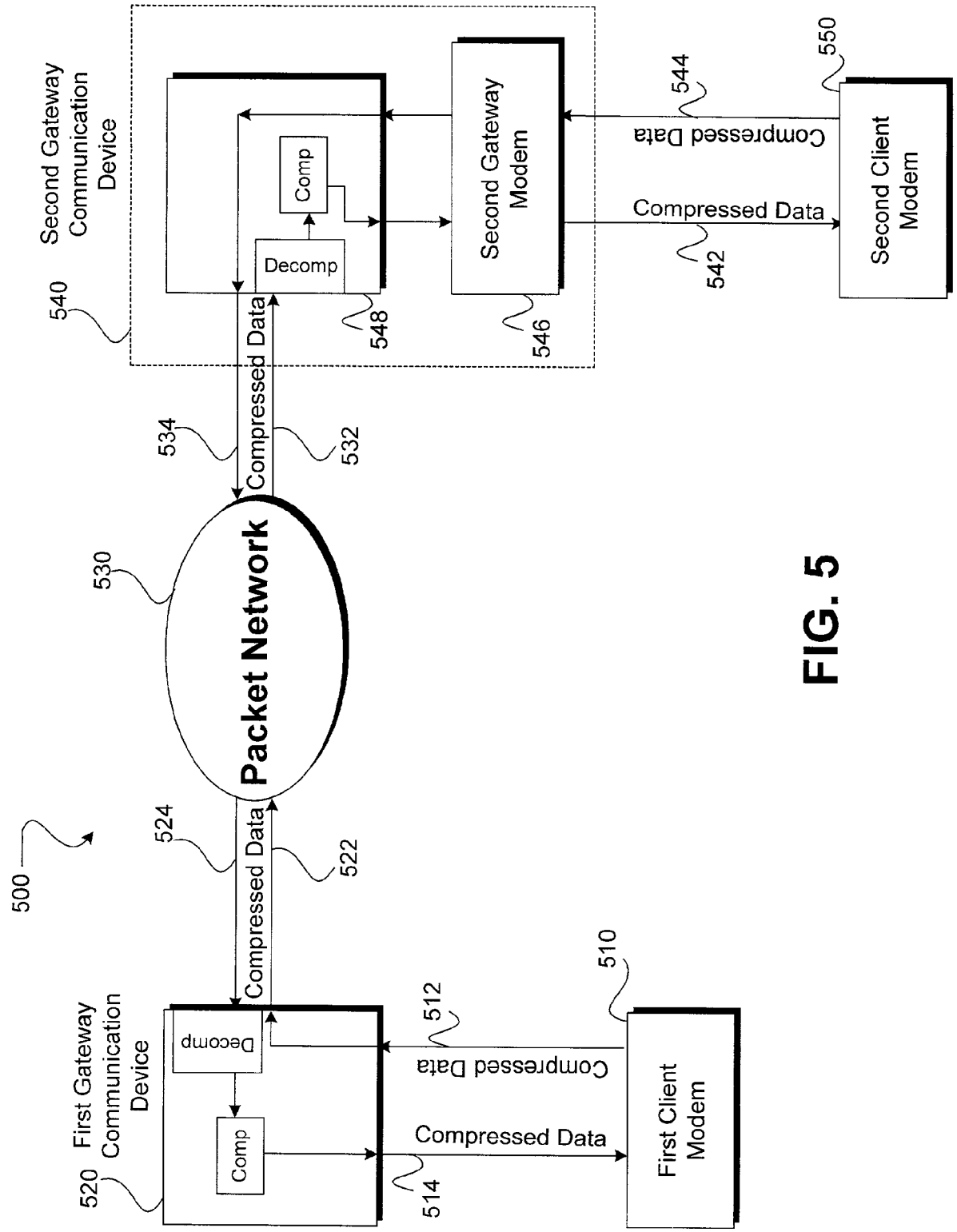
FIG. 5 illustrates a block diagram of a communication system, according to one embodiment of the present invention, based on a packet network, such as the Internet, utilizing the Internet Protocol.

FIG. 5 illustrates a block diagram of a communication system, according to one embodiment of the present invention, based on a packet network, such as the Internet, utilizing the Internet Protocol. FIG. 5 shows an exemplary embodiment, wherein first client modem 510, first gateway communication device 520, packet network 530 and lines 512, 514, 522 and 524 correspond to first client communication device 210, first gateway communication device 220, packet network 230 and lines 212, 214, 222 and 224, respectively. Further, second client modem 550 and lines 542, 544, 532 and 534 correspond to second client communication device 250 and lines 242, 244, 232 and 234, respectively.

As shown in FIG. 5, second gateway communication device 540 illustrates one embodiment of the present invention, according to which second gateway modem 546 is in communication with second client modem 550 and is capable of performing various tasks, such as those tasks performed in steps 306 and 318 of FIG. 3. For example, second gateway modem 546 is capable of placing a call to second client modem 550 and support various data modulation protocols for data communication with second client modem 550. However, a separate device, such as server 548 may perform compression/decompression related tasks described in conjunction with FIG. 3 above. Similarly, in some embodiments, first gateway communication device 520 may also a first gateway modem (not shown) and a separate device for performing compression/decompression related tasks (not shown). For example, a central server may perform compression/decompression related tasks described in conjunction with FIG. 3 above.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A communication method for use in a communication system including a first communication device in communication with a second communication device over a packet network, said method comprising:
   receiving a first compressed data from said second communication device by said first communication device over said packet network, wherein said first compressed data is compressed according to a first protocol;
   decompressing said first compressed data, by said first communication device, according to said first protocol to generate a first decompressed data;
   compressing said first decompressed data to generate a second compressed data, wherein said second compressed data is compressed by said first communication device according to a second protocol;
   transmitting said second compressed data to a third communication device in communication with said first communication device;
   receiving a third compressed data from said third communication device by said first communication device, wherein said third compressed data is compressed according to said second protocol; and
   transmitting said third compressed data to said second communication device, without decompressing said third compressed data, by said first communication device to said second communication device over said packet network;
   wherein said first protocol differs from said second protocol.

2. The method of claim 1, wherein said first protocol has a plurality of first parameters and said second protocol has a plurality of second parameters, and wherein at least one parameter of said plurality of first parameters is different than a corresponding parameter of said plurality of second parameters.

3. The method of claim 2, wherein said at least one parameter is a dictionary size.

4. The method of claim 1, wherein said first protocol is V.44 having a plurality of first parameters and said second protocol is V.44 having a plurality of second parameters, wherein at least one parameter of said plurality of first parameters is different than a corresponding parameter of said plurality of second parameters.

5. The method of claim 1, wherein said first protocol is V.44 and said second protocol is V.42bis.

6. A communication method for use in a communication system including a first modem, a second modem and a third modem, said method comprising:
   receiving a call from said first modem by said second modem over a telephone line;
   contacting said third modem over a packet network;
   receiving information, from said third modem by said second modem, relating to one or more data compression protocols supported by said third modem;
   handshaking by said second modem with said first modem to establish a connection; and
   negotiating a first data compression protocol by said second modem with said first modem, wherein said first data compression protocol is according to said information relating to one of said one or more data compression protocols.

7. The method of claim 6 further comprising:
   receiving a first compressed data from said first modem by said second modem, wherein said first compressed data is compressed according to said first data compression protocol; and
   transmitting said first compressed data to said third modem by said second modem.

8. The method of claim 7 further comprising:
   receiving a second compressed data from said third modem by said second modem, wherein said second compressed data is compressed according to a second data compression protocol, wherein said first data compression protocol differs from said second data compression protocol;
   decompressing said second compressed data, by said second modem, according to said second data compression protocol to generate a second decompressed data; and
   compressing said second decompressed data to generate a third compressed data, wherein said third compressed data is compressed by said second modem according to said first protocol; and
   transmitting said third compressed data to said first modem by said second modem.

9. The method of claim 6 further comprising:
   receiving a second compressed data from said third modem by said second modem, wherein said second compressed data is compressed according to a second data compression protocol, wherein said first data compression protocol differs from said second data compression protocol;
   decompressing said second compressed data, by said second modem, according to said second data compression protocol to generate a second decompressed data; and
   compressing said second decompressed data to generate a third compressed data, wherein said third compressed data is compressed by said second modem according to said first protocol; and
   transmitting said third compressed data to said first modem by said second modem.

10. The method of claim 6, wherein said information relating to said one or more data compression protocols includes information relating to at least one parameter of at least one of said one or more data compression protocols.

11. The method of claim 10, wherein said at least one parameter is a dictionary size.

12. The method of claim 6 further comprising:
    determining that said first data compression protocol, including its parameters, is the same as a second data compression protocol, including its parameters, negotiated between said third modem and a fourth modem;
    receiving a first compressed data from said third modem by said second modem, wherein said first compressed data is compressed according to said first data compression protocol; and
    transmitting said first compressed data to said first modem by said second modem.

13. A communication device comprising:
    a receiver configured to receive a first compressed data from a first device over a packet network, wherein said first compressed data is compressed according to a first protocol;
    a decompressing module configured to decompress said first compressed data according to said first protocol to generate a first decompressed data;
    a compressing module configured to compress said first decompressed data according to a second protocol to generate a second compressed data, wherein said second protocol differs from said first protocol; and a transmitter configured to transmit said second compressed data to a second device over a communication line;

wherein a third compressed data from said second device is passed through, without decompressing said third compressed data, to said first device over said packet network, and wherein said third compressed data is compressed according to said second protocol.

14. The device of claim 13, wherein said first protocol has a plurality of first parameters and said second protocol has a plurality of second parameters, and wherein at least one parameter of said plurality of first parameters is different than a corresponding parameter of said plurality of second parameters.

15. The device of claim 14, wherein said at least one parameter is a dictionary size.

16. The device of claim 13, wherein said first protocol is V.44 having a plurality of first parameters and said second protocol is V.44 having a plurality of second parameters, wherein at least one parameter of said plurality of first parameters is different than a corresponding parameter of said plurality of second parameters.

17. The device of claim 13, wherein said first protocol is V.44 and said second protocol is V.42bis.

18. The device of claim 13, wherein said second device is a gateway modem, and wherein said gateway modem is in communication with a client modem over a telephone line.

19. The device of claim 18, wherein said device is a server.

20. The device of claim 13, wherein said device is a gateway modem and said second device is a client modem.

21. A modem comprising:
a receiver configured to receive a call from a first modem over a telephone line;
a processing module configured to contact a second modem over a packet network in response to said call, and configured to receive information from said second modem relating to one or more data compression protocols supported by said second modem;
a handshaking module configured to establish a connection with said first modem; and
a data compression module configured to negotiate a first data compression protocol with said first modem;
wherein said first data compression protocol is according to said information relating to one of said one or more data compression protocols.

22. The modem of claim 21, wherein said modem is configured to receive a first compressed data from said first modem, said first compressed data being compressed according to said first data compression protocol, and wherein said modem is configured to transmit said first compressed data to said second modem.

23. The modem of claim 22, wherein said modem is configured to receive a second compressed data from said second modem, said second compressed data being compressed according to a second data compression protocol, wherein said second data compression protocol differs from said first data compression protocol, wherein said modem is configured to decompress said second compressed data according to said second data compression protocol to generate a second decompressed data, wherein said modem is configured to compress said second decompressed data to generate a third compressed data, said third compressed data being compressed according to said first protocol, and wherein said modem is configured to transmit said third compressed data to said first modem.

24. The modem of claim 21, wherein said modem is configured to receive a second compressed data from said second modem, said second compressed data being compressed according to a second data compression protocol, wherein said second data compression protocol differs from said first data compression protocol, wherein said modem is configured to decompress said second compressed data according to said second data compression protocol to generate a second decompressed data, wherein said modem is s configured to compress aid second decompressed data to generate a third compressed data, said third compressed data being compressed according to said first protocol, and wherein said modem is configured to transmit said third compressed data to said first modem.

25. The modem of claim 21, wherein said information relating to said one or more data compression protocols includes information relating to at least one parameter of at least one of said one or more data compression protocols.

26. The modem of claim 25, wherein said at least one parameter is a dictionary size.

27. The modem of claim 21, wherein said modem is configured to determine that said first data compression protocol, including its parameters, is the same as a second data compression protocol, including its parameters, negotiated between said second modem and a third modem, wherein said modem is configured to receive a first compressed data from said second modem, said first compressed data being compressed according to said first data compression protocol, and wherein said modem is configured to transmit said first compressed data to said first modem.

28. A communication method for use in a communication system including a first modem, a second modem and a third modem, said method comprising:
receiving a call from said first modem by said second modem over a telephone line;
contacting said third modem by said second modem over a packet network, wherein said third modem is in communication with a device;
receiving information, from said device by said second modem, relating to one or more data compression protocols supported by said device;
handshaking by said second modem with said first modem to establish a connection; and
negotiating a first data compression protocol by said second modem with said first modem, wherein said first data compression protocol is according to said information relating to one of said one or more data compression protocols.

29. The method of claim 28, wherein said device is a server device.

30. The method of claim 28 further comprising:
receiving a first compressed data from said first modem by said second modem, wherein said first compressed data is compressed according to said first data compression protocol; and
transmitting said first compressed data by said second modem.

31. The method of claim 30 further comprising:
receiving a second compressed data from said device by said second modem, wherein said second compressed data is compressed according to a second data compression protocol, wherein said second data compression protocol differs from said first data compression protocol;

decompressing said second compressed data, by said second modem, according to said second data compression protocol to generate a second decompressed data; and compressing said second decompressed data to generate a third compressed data, wherein said third compressed data is compressed by said second modem according to said first protocol; and transmitting said third compressed data to said first modem by said second modem.

32. The method of claim 28 further comprising:

receiving a second compressed data from said device by said second modem, wherein said second compressed data is compressed according to a second data compression protocol, wherein said second data compression protocol differs from said first data compression protocol;

decompressing said second compressed data, by said second modem, according to said second data compression protocol to generate a second decompressed data; and compressing said second decompressed data to generate a third compressed data, wherein said third compressed data is compressed by said second modem according to said first protocol; and transmitting said third compressed data to said first modem by said second modem.

33. The method of claim 28, wherein said information relating to said one or more data compression protocols includes information relating to at least one parameter of at least one of said one or more data compression protocols.

34. The method of claim 33, wherein said at least one parameter is a dictionary size.

35. The method of claim 28 further comprising:

determining that said first data compression protocol, including its parameters, is the same as a second data compression protocol, including its parameters, negotiated between said device and a fourth modem;

receiving a first compressed data from said device by said second modem, wherein said first compressed data is compressed according to said first data compression protocol; and transmitting said first compressed data to said first modem by said second modem.

* * * * *

UNITED STATES PATENT AND TRADEMARK OFFICE
CERTIFICATE OF CORRECTION

| | | |
|---|---|---|
| PATENT NO. | : 7,263,107 B1 | Page 1 of 1 |
| APPLICATION NO. | : 10/004655 | |
| DATED | : August 28, 2007 | |
| INVENTOR(S) | : Johnston et al. | |

It is certified that error appears in the above-identified patent and that said Letters Patent is hereby corrected as shown below:

In the claims, column 14, line 10, reading "is s configured to compress aid second decompressed data to" should read --is configured to compress said second decompressed data to--.

Signed and Sealed this

Twenty-seventh Day of November, 2007

JON W. DUDAS
*Director of the United States Patent and Trademark Office*